United States Patent

[11] 3,600,980

| [72] | Inventor | Sulo A. Aijala<br>Attleboro, Mass. |
|---|---|---|
| [21] | Appl. No. | 881,011 |
| [22] | Filed | Dec. 1, 1969 |
| [45] | Patented | Aug. 24, 1971 |
| [73] | Assignee | Intricate Machine & Engineering Inc. |

[54] DEVICE FOR POSITIONING A SAW IN A MACHINE FOR OPERATING ON THE TEETH OF THE SAW
6 Claims, 5 Drawing Figs.

[52] U.S. Cl.......................................... 76/25,
33/185, 76/74, 76/78, 269/307
[51] Int. Cl. ............................................. B23d 63/00
[50] Field of Search........................................ 76/43, 74,
78, 25, 37; 269/307; 33/110, 185

[56] References Cited
UNITED STATES PATENTS

| 2,910,776 | 11/1959 | Anderson..................... | 33/110 |
| 3,304,811 | 2/1967 | DeWitt......................... | 76/43 |

*Primary Examiner*—Bernard Stickney
*Attorney*—Barlow & Barlow

ABSTRACT: A device separate from a machine for retoothing or sharpening a saw which device is to be used for locating a saw with respect to a saw holder and with respect to the means to perform a particular operation on the teeth, after which the saw is clamped on the saw holder and the holder and saw are removed from the device and placed in the machine for operating on the saw. Selective means are provided for abutting the saw teeth for one of a plurality of operations or for different sizes of saws.

PATENTED AUG 24 1971

3,600,980

INVENTOR
SULO A. AIJALA
BY
Barlow & Barlow
ATTORNEYS

DEVICE FOR POSITIONING A SAW IN A MACHINE FOR OPERATING ON THE TEETH OF THE SAW

RELATED APPLICATION

This application is related to an application of the same inventor filed of even date Ser. No. 881,010 in which the saw holding means in conjunction with a saw carriage is disclosed.

BACKGROUND OF THE INVENTION

Heretofore, a saw was positioned in a retoothing or sharpening machine usually by eye which requires a high degree of skill. After the saw was put into the machine some adjustments were made in order that the teeth might be properly positioned with reference to the operation to be performed upon them.

SUMMARY OF THE INVENTION

A device to receive a saw holder, which is a part of the machine for operating upon the teeth of a hand saw and assist in locating a saw on the holder in a certain position dependent upon the operation to be performed on the saw. After locating and securing the saw on the holder, the holder and saw are removed from the device and placed in a machine for operating on the teeth of the saw. A selected one of a plurality of abutments to engage the teeth or the spaces between the teeth of the saw are arranged for presentation to the toothed edge of the saw in accordance with a selected indicia to properly locate the saw on the holder.

DESCRIPTION OF THE PREFERRED EMBODIMENT

Figures 1, 2, 3, 4, 5:
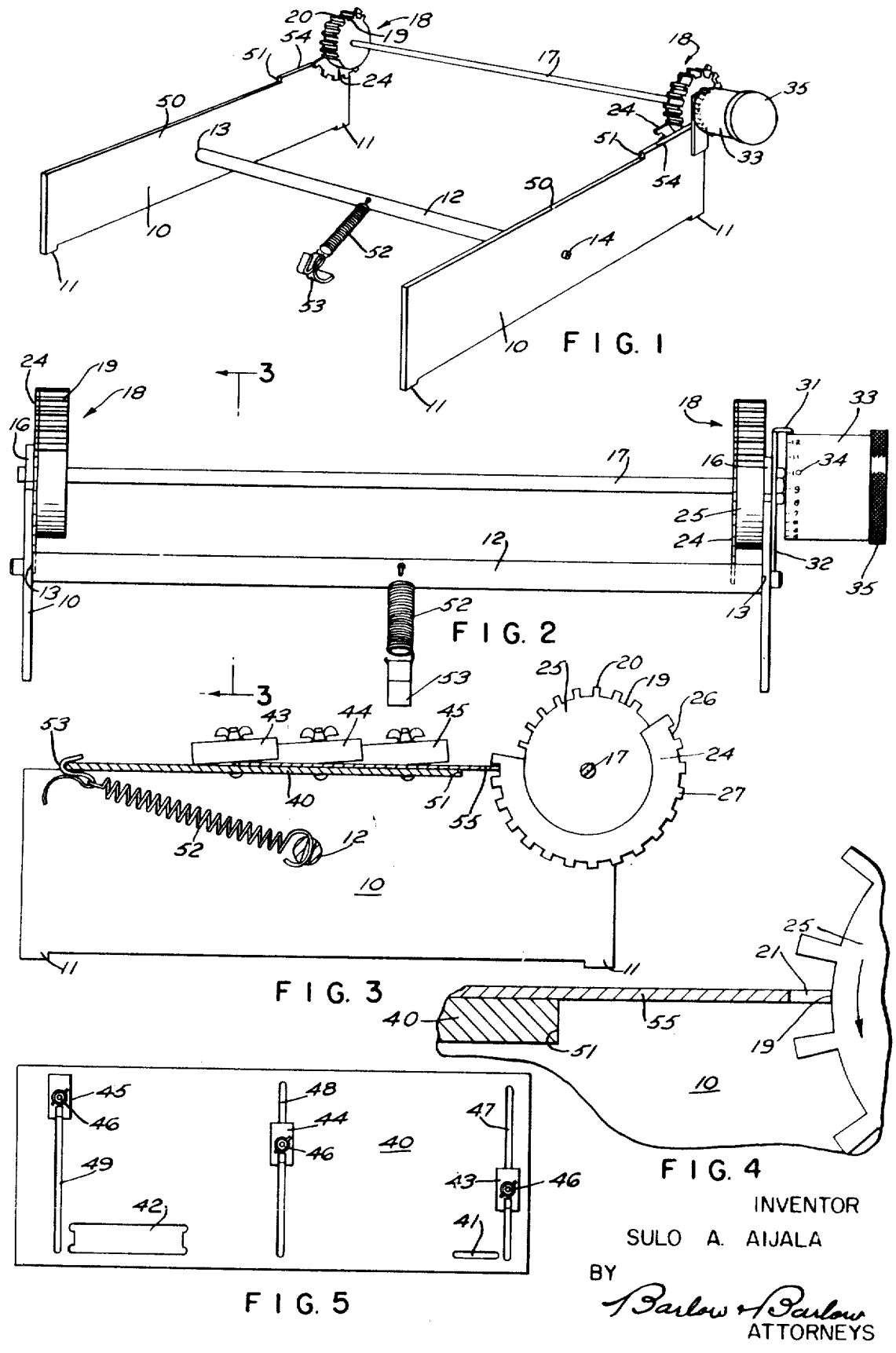
FIG. 1 is a perspective view of the device with the work omitted therefrom.
FIG. 2 is an elevational view of the device shown in FIG. 1.
FIG. 3 is a sectional view showing the saw holder and the saw in position with the toothed edge of the saw engaging the abutment means.
FIG. 4 is a fragmental sectional view similar to FIG. 3 but on a larger scale and showing a different abutment engaging the toothed edge of the saw.
FIG. 5 is a top plan view of the saw holder member with the saw omitted.

This device comprises a pair of spaced plates 10 having at the lower edge thereof feet 11. These plates are held in spaced relation by a rod 12 having reduced portions to provide shoulders 13 to engage the inner surfaces of the plate while the reduced portions of the rod extend through the plates and are engaged by nuts 14 to hold the rod securely in position, spacing the plates as shown in FIG. 1.

At one end of the plates 10 there is a raised portion 16 having an opening therein to provide a bearing for a shaft 17 which is rotatable in these bearings. Close to the inner surfaces of the plates 10 there are abutment means 18 fixed on the shaft 17. The abutment means 18 comprises a plurality of surfaces 19 on a relative thick disk 25 at different radial distances from the axis of the shaft 17 in substantially the form of a cam with or without barriers 20 to extend on either side of the saw blade. The surfaces 19 provide abutments presented to the toothed edge of the saw for various size teeth for an operation to be performed thereon. The abutment means 18 also comprises a thin portion of an annulus 24 fixed to the thicker disk 25 covering an arcuate portion of this thicker disk such as may be clearly seen in FIG. 3. This fragmental portion 24 of the annulus presents a plurality of abutments 26 in the form of a cam with or without barriers 27 to extend on either side of the saw blade.

These thinner annuluses 24 are for entering the space between the teeth of the saw to engage the bottoms of the tooth and are shown in such position in FIG. 3 whereas the showing in FIG. 4 shows the end of a saw tooth 21 that is engaging the cam surface or abutment 19. The plates 10 are provided with shoulders 51 raised from the edges 50 of the plates.

In operation, a saw holding plate 40, shown by itself in FIG. 5, is laid upon the upper edges 50 of the plates 10 and against shoulders 51 which shoulders are in parallel relation to the shaft 17. This plate is held against the abutments 51 by means of the spring 52 and hook 53 which extends from the shaft or rod 12 into engaging relation with the plate 40. Plate 40 is of a thickness so that its upper surface will be flush with the edge 54 of the plates 10. A saw 55 is then laid upon the surface of the plate 40 and will engage the surface of plate 40 and edge 54 in a single plane. When the saw is so positioned, the drum 33, which is fixed on the shaft 17 and which carries indicia 34, is rotated by the knurled handle 35 so that the proper marking thereon is brought under the pointer 31 that may be part of an arm 32 that mounts it in position on the plate 10. The indicia are provided so the operator will present the proper abutment to the toothed edge of the saw. The saw is then moved in position to engage the selected abutments and clamped in position by clamps 43, 44 and 45 which are movable along the slots 47, 48 and 49 and which engage the back of the saw. Wing nuts 46 on each clamp securely hold the saw in place. Slots 41, 42 are provided in the saw holding plate 40 for locating the plate properly in the machine which is to operate upon the saw, as more fully described in the above referred to application.

By this arrangement guesswork is eliminated and the inaccuracy of the eye is replaced by a device which may quickly and accurately position the saw in its holder for mounting in the machine.

I claim:

1. A saw positioning device comprising a pair of spaced abutment means, each having abutments at varying distances from a fixed point for engaging the toothed edge of a saw, and means to locate a saw holding member in a definite relation to said abutments.

2. A saw positioning device as in claim 1 wherein said abutment means are secured to a common shaft means to rotatably mount said shaft for rotating said abutments in unison.

3. A saw positioning device as in claim 1 wherein said locating means is a pair of shoulders at spaced locations.

4. A saw positioning device comprising a pair of plates in parallel relation, each having a shoulder to engage a saw holding plate, resilient means to urge said saw holder against said shoulders, a shaft rotatably mounted on said plates and abutment means for engaging the toothed edge of a saw fixed on said shaft.

5. A saw positioning device as in claim 4 wherein each of said abutment means comprises a disk presenting surfaces at different radial distances from the axis of said shaft.

6. A saw positioning device as in claim 4 wherein each of said abutment means comprises a disk presenting surfaces at different radial distances from the axis of said shaft and indicating means on said shaft for selecting the desired radial distance to be presented to the saw teeth.